United States Patent
Glazier et al.

(10) Patent No.: US 10,338,687 B2
(45) Date of Patent: Jul. 2, 2019

(54) TELEPORTATION IN AN AUGMENTED AND/OR VIRTUAL REALITY ENVIRONMENT

(71) Applicant: GOOGLE INC., Mountain View, CA (US)

(72) Inventors: Adam Glazier, Oakland, CA (US); Evan Hardesty Parker, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 266 days.

(21) Appl. No.: 15/368,191

(22) Filed: Dec. 2, 2016

(65) Prior Publication Data

US 2017/0160815 A1 Jun. 8, 2017

Related U.S. Application Data

(60) Provisional application No. 62/262,451, filed on Dec. 3, 2015.

(51) Int. Cl.
| | |
|---|---|
| *G06F 3/01* | (2006.01) |
| *G06T 19/00* | (2011.01) |
| *G06F 3/0481* | (2013.01) |
| *G06F 3/0346* | (2013.01) |
| *G06T 19/20* | (2011.01) |

(52) U.S. Cl.
CPC .............. *G06F 3/017* (2013.01); *G06F 3/011* (2013.01); *G06F 3/013* (2013.01); *G06F 3/0346* (2013.01); *G06F 3/04815* (2013.01); *G06T 19/006* (2013.01); *G06T 19/20* (2013.01)

(58) Field of Classification Search
CPC .. G06F 3/04815; G06F 3/04842; G06F 3/011; G06F 3/0487; G06F 3/048; G06F 3/017; G06F 3/04845; G06F 17/30873; G06F 17/30061; H04N 13/344; H04N 13/366; H04N 13/398; H04N 7/157;
(Continued)

(56) References Cited

U.S. PATENT DOCUMENTS

| 8,392,853 B2 | 3/2013 | Shipley et al. |
| 8,473,852 B2 | 6/2013 | Russell et al. |

(Continued)

FOREIGN PATENT DOCUMENTS

| CA | 2686991 A1 * | 6/2011 | ............... G06T 1/00 |

OTHER PUBLICATIONS

International Search Report and Written Opinion received for PCT Patent Application No. PCT/US2016/064919, dated Mar. 15, 2017, 10 pages.
(Continued)

*Primary Examiner* — Sardis F Azongha
(74) *Attorney, Agent, or Firm* — Brake Hughes Bellermann LLP

(57) ABSTRACT

In a system for teleporting and scaling in a virtual reality environment, a user may teleport from a first virtual location, being experienced at a first scale, to a second virtual location, to be experienced at a second scale. The user may select the new, second virtual location and the new, second scale with a single external input via a handheld electronic device so that, upon release of a triggering action of the electronic device, the user may teleport to the newly selected second virtual location at the newly selected scale.

23 Claims, 19 Drawing Sheets

(58) Field of Classification Search
CPC ...... A63F 2300/5553; A63F 2300/8082; A63F 2300/5533; A63F 2300/308; A63F 13/216
See application file for complete search history.

(56) References Cited

U.S. PATENT DOCUMENTS

| | | |
|---|---|---|
| 8,805,813 B2 | 8/2014 | Branca et al. |
| 10,062,208 B2* | 8/2018 | Ziman .................... G06T 19/003 |
| 2006/0119598 A1 | 6/2006 | Littlefield et al. |
| 2010/0088600 A1* | 4/2010 | Hamilton, II ........... A63F 13/12 |
| | | 715/706 |
| 2011/0055727 A1* | 3/2011 | Dawson .............. G06F 3/04815 |
| | | 715/753 |
| 2011/0109628 A1 | 5/2011 | Rurin |
| 2011/0164059 A1* | 7/2011 | Bhosale .................... G06T 1/00 |
| | | 345/660 |
| 2012/0188256 A1* | 7/2012 | Lee ......................... G06T 13/00 |
| | | 345/473 |
| 2013/0044106 A1* | 2/2013 | Shuster ................... G06T 19/20 |
| | | 345/419 |
| 2013/0314320 A1* | 11/2013 | Hwang ................. G06F 3/0346 |
| | | 345/158 |
| 2013/0321462 A1 | 12/2013 | Salter et al. |
| 2013/0326364 A1 | 12/2013 | Latta et al. |
| 2014/0062900 A1 | 3/2014 | Kaula et al. |
| 2016/0196692 A1* | 7/2016 | Kjallstrom ............ G06T 19/006 |
| | | 345/633 |

OTHER PUBLICATIONS

Office Action for Canadian Application No. 2,998,733, dated Jan. 25, 2019, 5 pages.

* cited by examiner

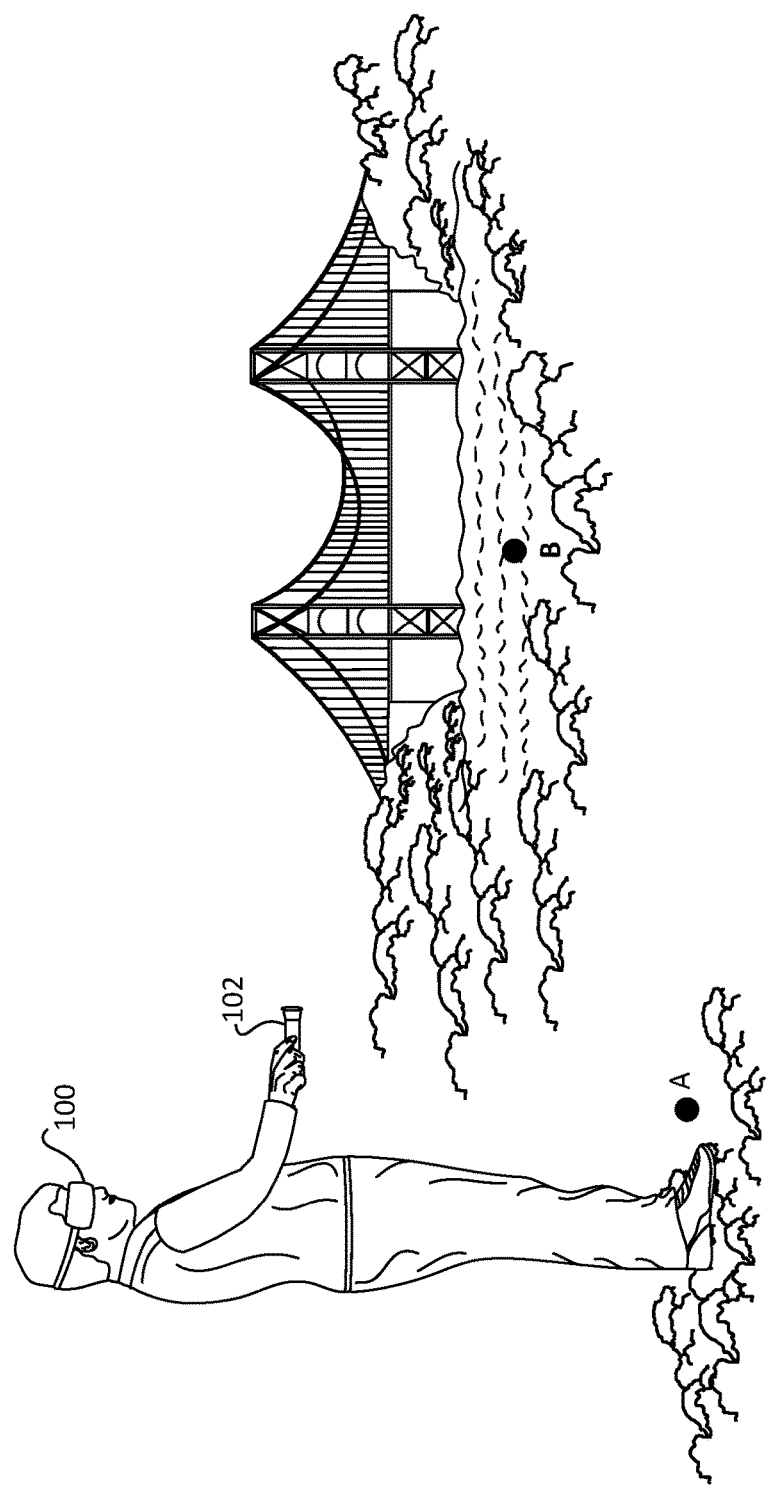

TELEPORTATION IN AN AUGMENTED AND/OR VIRTUAL REALITY ENVIRONMENT

CROSS REFERENCE TO RELATED APPLICATION(S)

This application is a Non-Provisional of, and claims priority to, U.S. Provisional Application No. 62/262,451, filed on Dec. 3, 2015, which is incorporated by reference herein in its entirety.

FIELD

This document relates, generally, to teleportation and scaling in a virtual reality environment.

BACKGROUND

An augmented reality (AR) system and/or a virtual reality (VR) system may generate a three-dimensional (3D) immersive virtual environment. A user may experience this virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, the user may move through the virtual environment, and may teleport to other areas of the virtual environment, through physical movement and/or manipulation of an electronic device to interact with the virtual environment and personalize interaction with the virtual environment.

SUMMARY

In one aspect, a method may include displaying a virtual rendering of a first virtual location in a virtual environment for viewing at a first virtual scale relative to the virtual environment, receiving an input selecting a second virtual location and selecting a second virtual scale for viewing of the second virtual location, the first virtual scale being different than the second virtual scale, and teleporting to the second virtual location at the second virtual scale after receiving the input.

In another aspect, a system may include a computing device configured to generate a virtual environment, the computing device including a memory storing executable instructions, and a processor configured to execute the instructions. Execution of the instructions may cause the computing device to display a virtual rendering of a first virtual location of a virtual environment for viewing at a first virtual scale within the virtual environment, receive an input indicating a selection of a second virtual location in the virtual environment, and a selection of second virtual scale for viewing of the second virtual location, and teleport to the second virtual location at the second virtual scale after receipt of the input.

The details of one or more implementations are set forth in the accompanying drawings and the description below. Other features will be apparent from the description and drawings, and from the claims.

BRIEF DESCRIPTION OF THE DRAWINGS

FIGS. 4A-4D, 5A-5F and 6A-6D are third person views illustrating teleportation and scaling in an augmented and/or virtual reality environment, in accordance with implementations as described herein.

DETAILED DESCRIPTION

Figure 1:
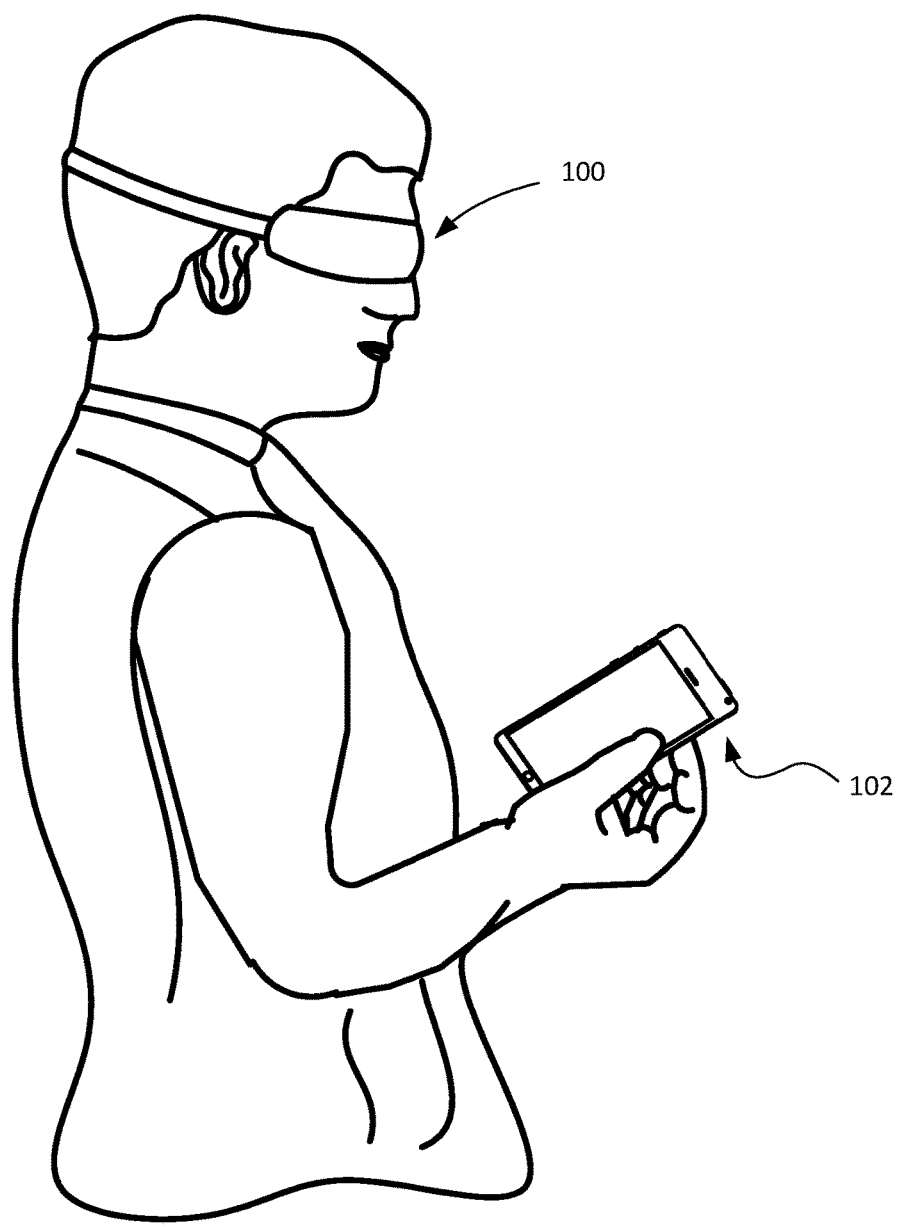
FIG. 1 is an example implementation of a virtual reality system including a head mounted display device and a handheld electronic device, in accordance with implementations as described herein.

A user immersed in an augmented reality and/or a virtual reality environment wearing, for example, a head mounted display (HMD) device may explore the virtual environment and interact with virtual objects, features and the like in the virtual environment through various different types of inputs. These inputs may include, for example, physical interaction including, for example, manipulation of an electronic device separate from the HMD such as, for example, a virtual ray or a virtual beam emitted by the electronic device and/or the HMD, a movement of the electronic device and/or the HMD, a touch applied on a touch sensitive surface of the electronic device and/or the HMD, and the like, and/or hand/arm gestures, head movement and/or head and/or eye directional gaze and the like. A user may implement one or more of these different types of interactions to execute a particular action in the virtual environment, such as, for example, moving through the virtual environment, and moving, or transitioning, or teleporting, from a first area of the virtual environment to a second area of the virtual environment, or from a first virtual environment to a second virtual environment.

A system and method, in accordance with implementations described herein, may facilitate teleportation from a first virtual area of the virtual environment to a second virtual area of the virtual environment, and/or from a first virtual environment to a second virtual environment. Herein, teleporting may include, for example, displaying in a virtual environment a rendering of a second virtual location instead of a first virtual location. A system and method, in accordance with implementations described herein, may also allow the user to adjust a scale of the virtual environment relative to a user, which may also be referred to as a virtual scale, and to scale in corresponding perspective, while moving from the first virtual area to the second virtual area, or from the first virtual environment to the second virtual environment. This scaling, and corresponding change in perspective, may include, for example, a perceived increase in the user's size relative to the elements of the virtual environment and/or a decrease in the size of the elements of the virtual environment (and corresponding change in perspective), or a perceived decrease in the user's size relative to the elements of the virtual environment and/or an increase in the size of the elements of the virtual environment (and corresponding change in perspective). Along with this perceived change in size, scale may also include adjustments based a change in a virtual distance between the user's eyes, so that changes in appearance, and perspective, maintain intended proportions.

In this manner, the user may arrive at the second virtual area, or at the second virtual environment, at the selected scaled size and/or perspective. This may provide the user with a substantially seamless transition experience from the first virtual area to the second virtual area of the virtual environment, or from the first virtual environment to the second virtual environment, at the selected scaled perspective and/or size, in a single action. That is, once the user has selected the second virtual area or second virtual location, and the scaled perspective and/or size, a single command, such as, for example, a manipulation of a manipulation device of a controller, may cause the selected changes in the virtual environment with respect to the user's virtual location and virtual perspective, providing the user with the feeling of a substantially instantaneous movement.

In the example implementation shown in FIG. 1, a user wearing an HMD 100 is holding a portable handheld electronic device 102. The handheld electronic device 102 may be, for example, a controller, a smartphone, a joystick, or another portable handheld electronic device(s) that may be paired with, and communicate with, the HMD 100 for interaction in the virtual environment generated by the HMD 100 and displayed to the user, for example, on a display of the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication between the handheld electronic device 102 and the HMD 100 and the exchange of data between the handheld electronic device 102 and the HMD 100. This may allow the handheld electronic device 102 to function as a controller in communication with the HMD 100 for interacting in the immersive virtual environment generated by the HMD 100. That is, a manipulation of the handheld electronic device 102, such as, for example, a virtual beam or a virtual ray directed from the handheld electronic device 102 to a virtual object for selection, and/or an input received on a touch surface of the handheld electronic device 102, and/or or a movement of the handheld electronic device 102, may be translated into a corresponding selection, or movement, or other type of interaction, in the virtual environment generated and displayed by the HMD 100. This may include, for example, a teleportation of the user from a current virtual environment to a selected destination virtual environment, and in some implementations may also include a scaling of a perspective, or a perceived size, of the user based on a user selection, in coordination with the teleportation to the selected destination virtual environment.

The example implementation shown in FIG. 1 includes one handheld electronic device 102 in communication with the HMD 100, for data exchange with the HMD 100, and interaction with the features, elements, objects and the like in the virtual environment generated by the HMD 100. However, in some implementations, more than one handheld electronic device 102 may be operably coupled with, and in communication with, the HMD 100, and may operate together, or separately, for interaction in the virtual environment.

Figure 2A:
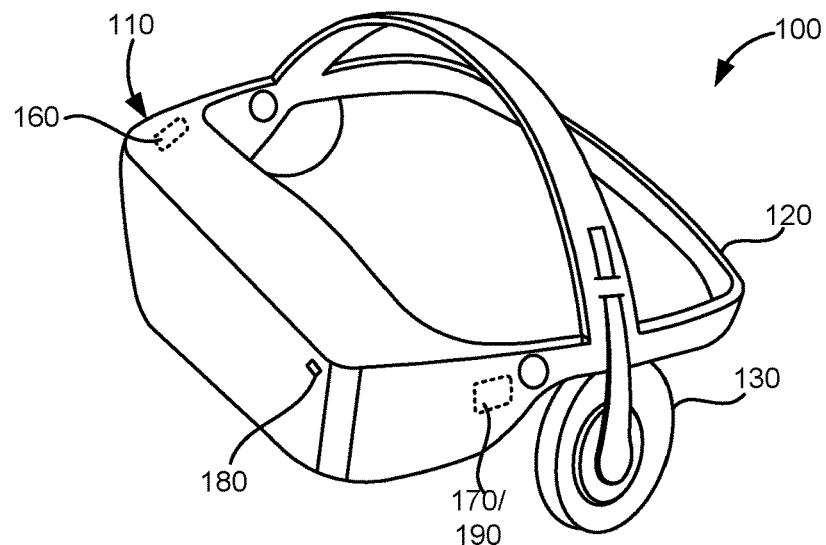
FIGS. 2A and 2B are perspective views of an example head mounted display device, in accordance with implementations as described herein.
Figure 2B:
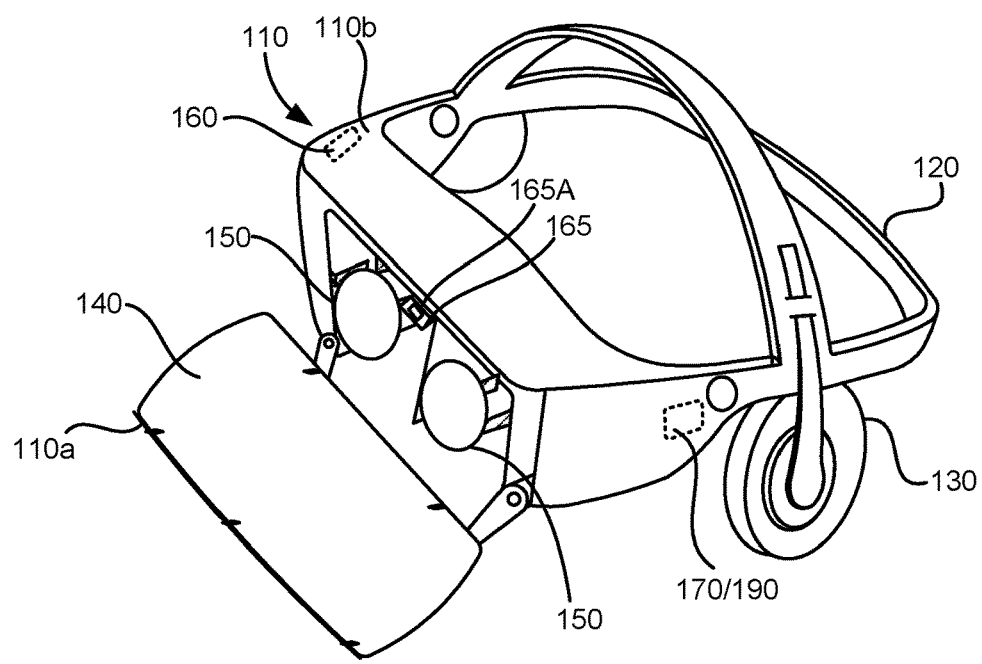

FIGS. 2A and 2B are perspective views of an example HMD, such as, for example, the HMD 100 worn by the user in FIG. 1. The HMD 100 may include a housing 110 coupled to a frame 120, with an audio output device 130 including, for example, speakers mounted in headphones, coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180, including, for example, an image sensor and/or a light sensor, to capture still and moving images. The images captured by the camera 180 may be used to help track a physical position of the user and/or the handheld electronic device 102 in the real world, or physical environment relative to the virtual environment, and/or may be displayed to the user on the display 140 in a pass through mode, providing the user with situational awareness with respect to aspects in the real world, physical environment and/or allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the virtual environment.

Figure 3:
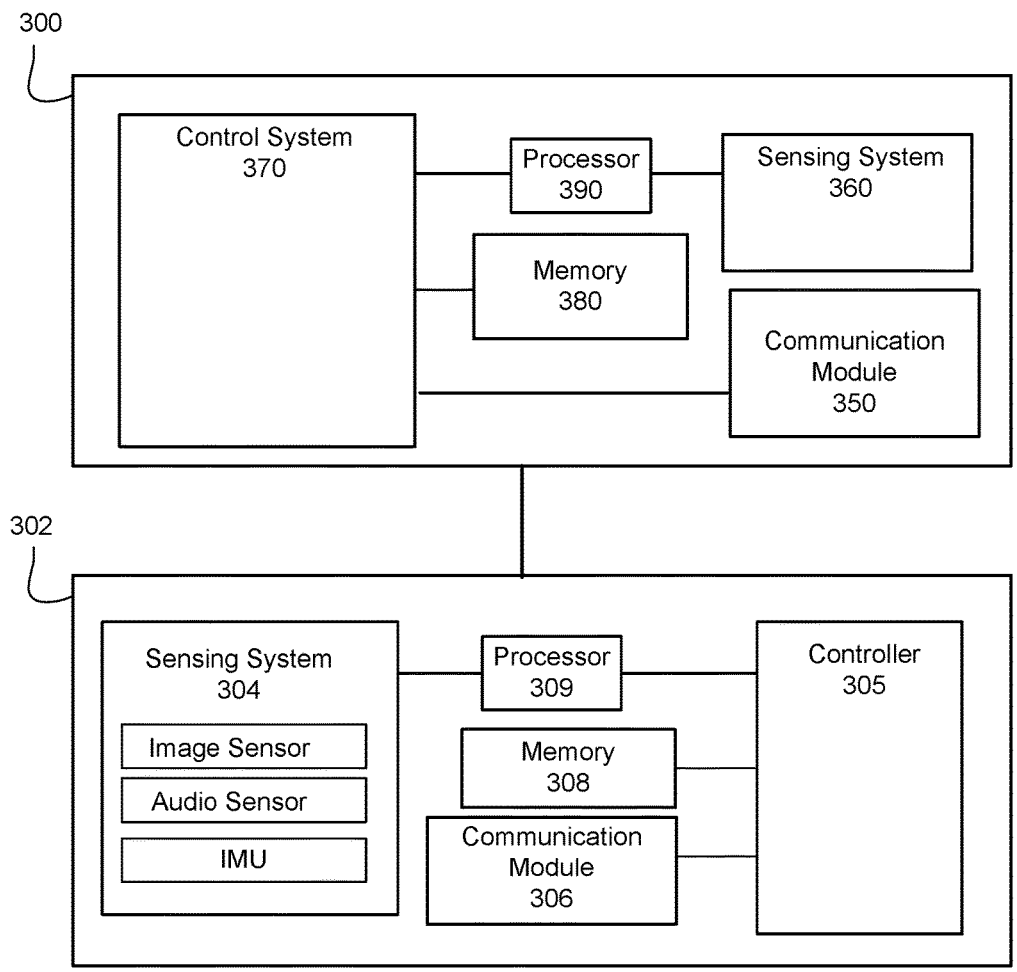
FIG. 3 is a block diagram of a head mounted electronic device and a handheld electronic device, in accordance with implementations as described herein.

A block diagram of a system providing for teleportation and scaling in an augmented and/or virtual reality environment is shown in FIG. 3. The system may include a first electronic device 300 in communication with a second electronic device 302. The first electronic device 300 may be, for example an HMD as described above with respect to FIGS. 1, 2A and 2B, generating and displaying a virtual environment, and the second electronic device 302 may be, for example, a handheld electronic device as described above with respect to FIG. 1, that is in communication with the first electronic device 300 to facilitate user interaction with the virtual environment generated and displayed by the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a virtual ray or a virtual beam as described above. The second electronic device 302 may include a sensing system 304 including, for example, an image sensor and an audio sensor, such as is included in, for example, a camera and microphone, an inertial measurement unit, a touch sensor such as is included in a touch sensitive surface of a handheld electronic device, or controller, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

An example implementation of a virtual reality system which allows a user to teleport from a first virtual location to a second virtual location, while also scaling the user's perspective, and/or perceived size relative to the virtual elements of the virtual environment, so that the user's perspective, or view, of the second virtual location is scaled in accordance with the user's newly selected scale, is shown in FIGS. 4A-4D and 5A-5F. FIGS. 4A-4D and 5A-5F illustrate a third person view of a user, including a view of a virtual environment generated by the HMD 100, including virtual features/virtual objects/virtual elements (for example, a bridge, water and the like) viewed by the user, for example, on the display 140 of the HMD 100. These elements would be viewed by the user, for example, on the display 140 within the HMD 100, and the representation of these virtual objects are shown in FIGS. 4A-4D and 5A-5F outside of the HMD 100, simply for ease of explanation and illustration.

Figure 4A:
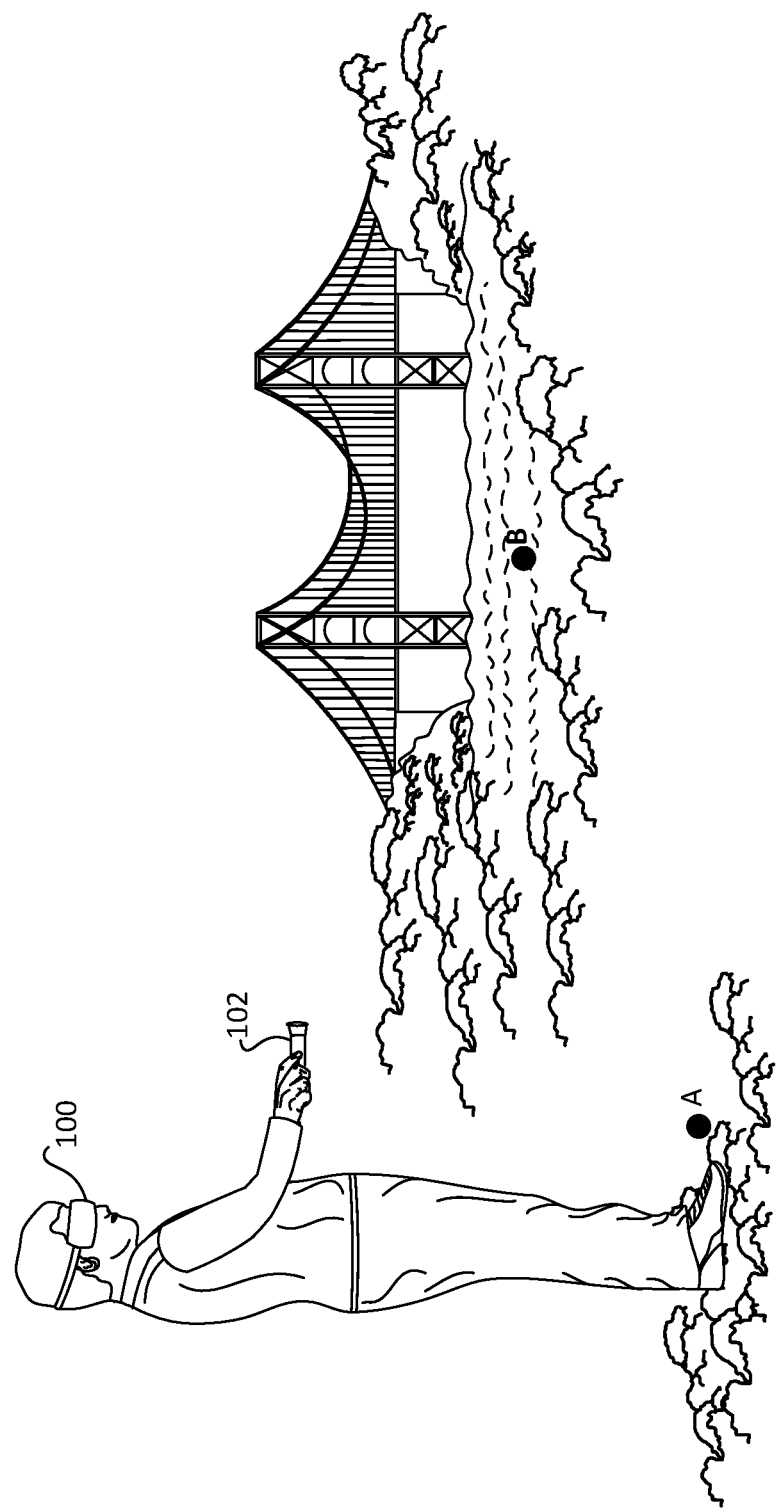

As shown in FIG. 4A, a user positioned at first virtual location A may actuate a control mechanism on the handheld electronic device 102. The control mechanism actuated by the user on the handheld electronic device 102 may be any one of a number of different control mechanisms provided on the handheld electronic device 102, such as, for example, a trigger, a button, a knob, a toggle, a switch, a joystick, a touch sensitive surface, and/or the like. Simply for ease of discussion and illustration, hereinafter, the control mechanism actuated by the user on the handheld electronic device 102 will be referred to as a trigger.

Figure 4B:
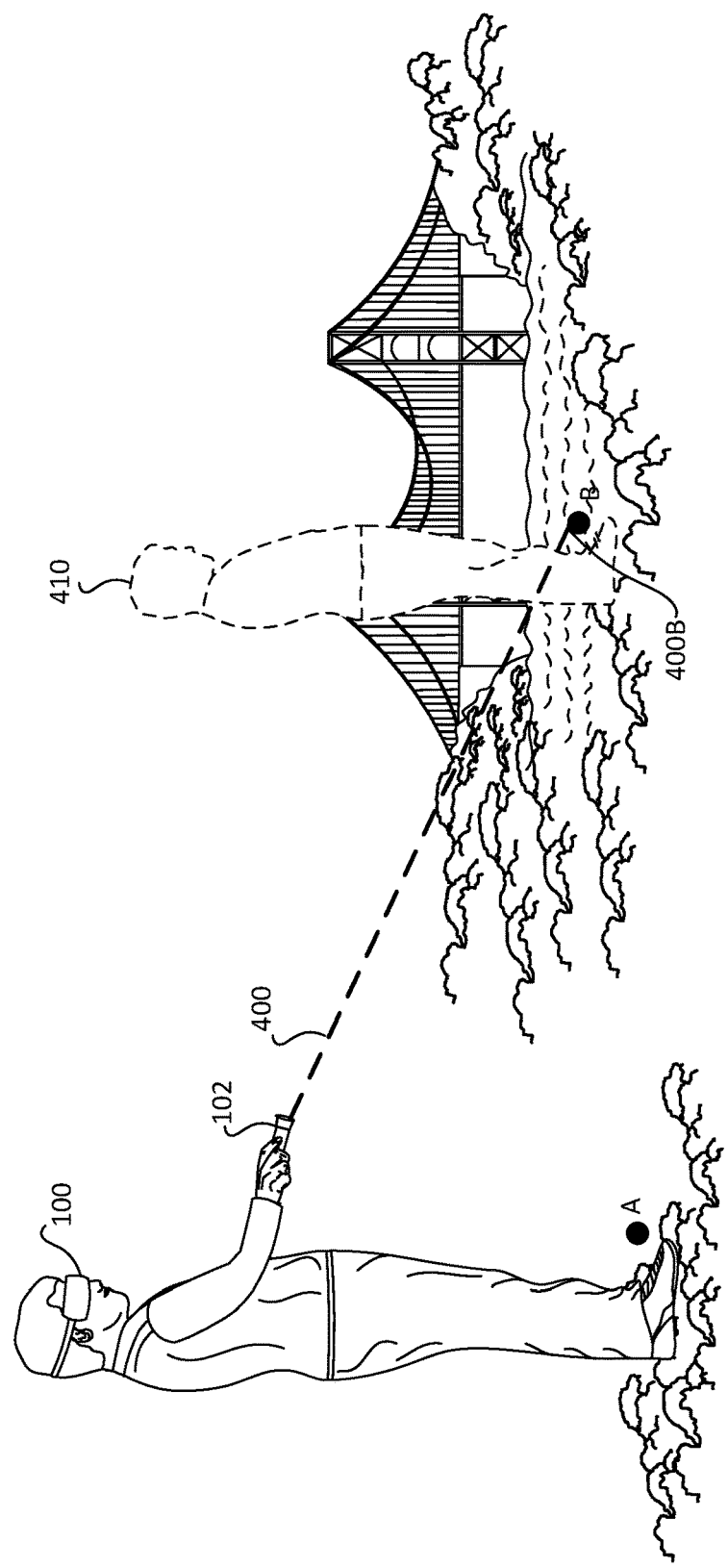

Actuation of the trigger may direct a virtual beam 400 outward from the handheld electronic device 102 toward a second virtual location B. The user may move the handheld electronic device 102 so that the virtual beam 400 intersects with the second virtual location B to be selected for teleportation. The point of intersection 400B between the virtual beam 400 and the virtual object to be selected (in this example, the second virtual location B) may be represented by, for example, a terminal end 400B, or endpoint 400B, of the virtual beam 400, at the intersection between the virtual beam and the selected second virtual location B, as shown in FIG. 4B, indicating the user wants to teleport from the first virtual location A to the second virtual location B. Hereinafter, simply for ease of discussion and illustration, the intersection area between the virtual beam 400 and the virtual object to be selected will be referred to as a virtual endpoint 400B. However, detection of any designated portion of the virtual beam 400 intersecting the virtual object to be selected, and/or within a set proximity of the virtual object to be selected, may be taken as an input for selection and manipulation of the virtual object. Along with the virtual beam 400 directed at the second virtual location B, the system may also generate a virtual visual representation 410 of the user, at the user's current size, or the user's current scale relative to the virtual elements in the virtual environment, as shown in FIG. 4B.

Figure 4C:
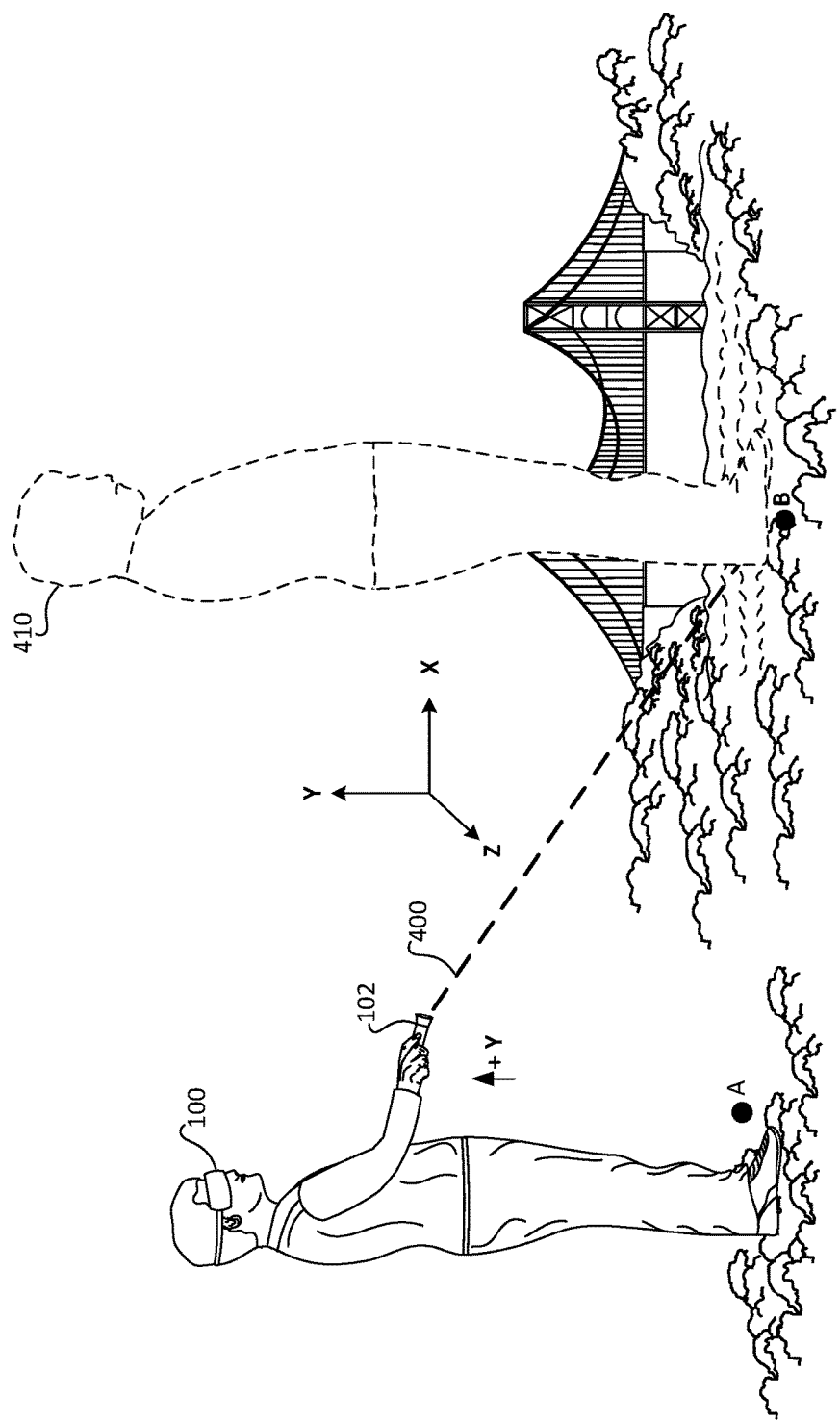
Figure 4D:
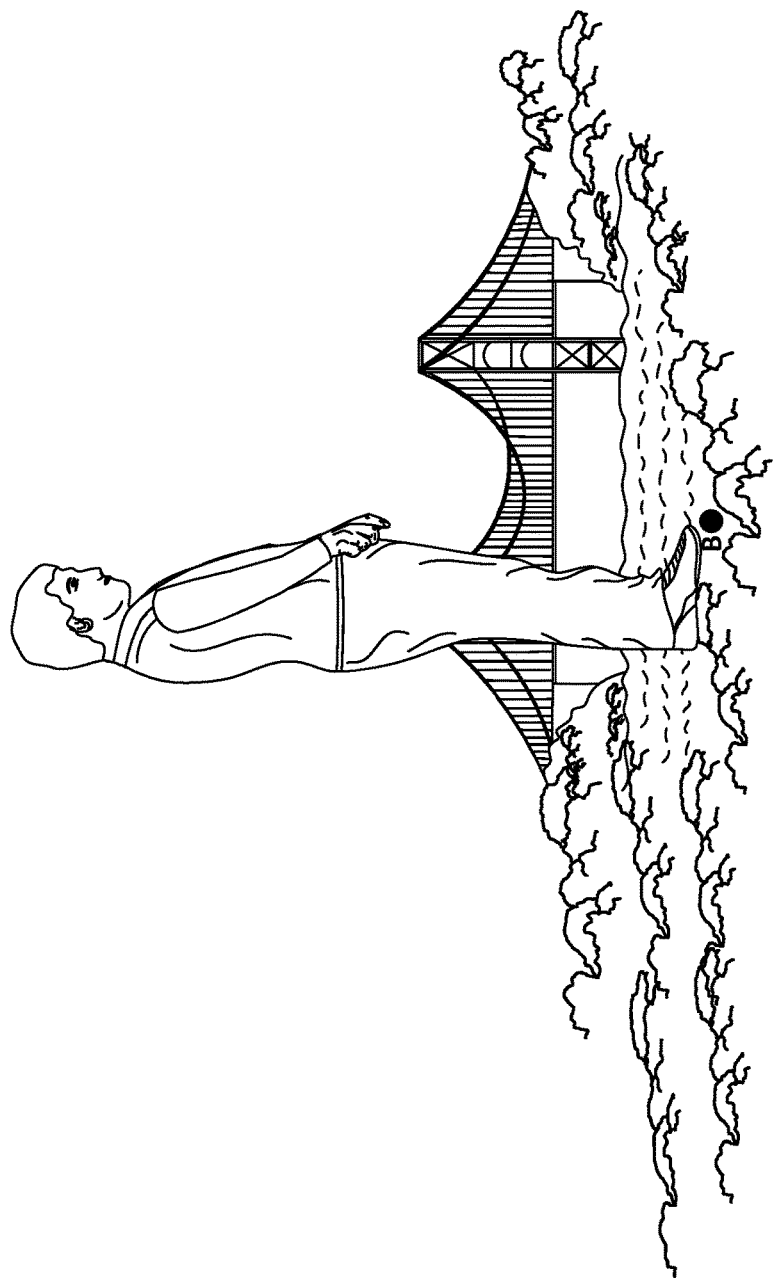

As shown in FIG. 4C, by continuing to actuate the trigger and manipulating the handheld electronic device 102 by, for example, moving the handheld electronic device 102 in an upward, or in a +Y, direction, or manipulating the trigger in an upward, or +Y, direction, the user may adjust, for example, increase his size, or his scale, or perspective, to be experienced upon teleportation to the second virtual location B. As the user continues to manipulate the handheld electronic device 102 to adjust scale in this manner, the visual representation 410 of the user may increase in size as the user moves the handheld electronic device 102, to provide a visual indication of relative scale to the user, as shown in FIG. 4C. Once the user has selected the desired second virtual location B and desired second scale in this manner, and then releases the trigger, the system may teleport the user to the second virtual location B, with his perspective adjusted to his increased scale, as shown in FIG. 4D.

Figure 5B:
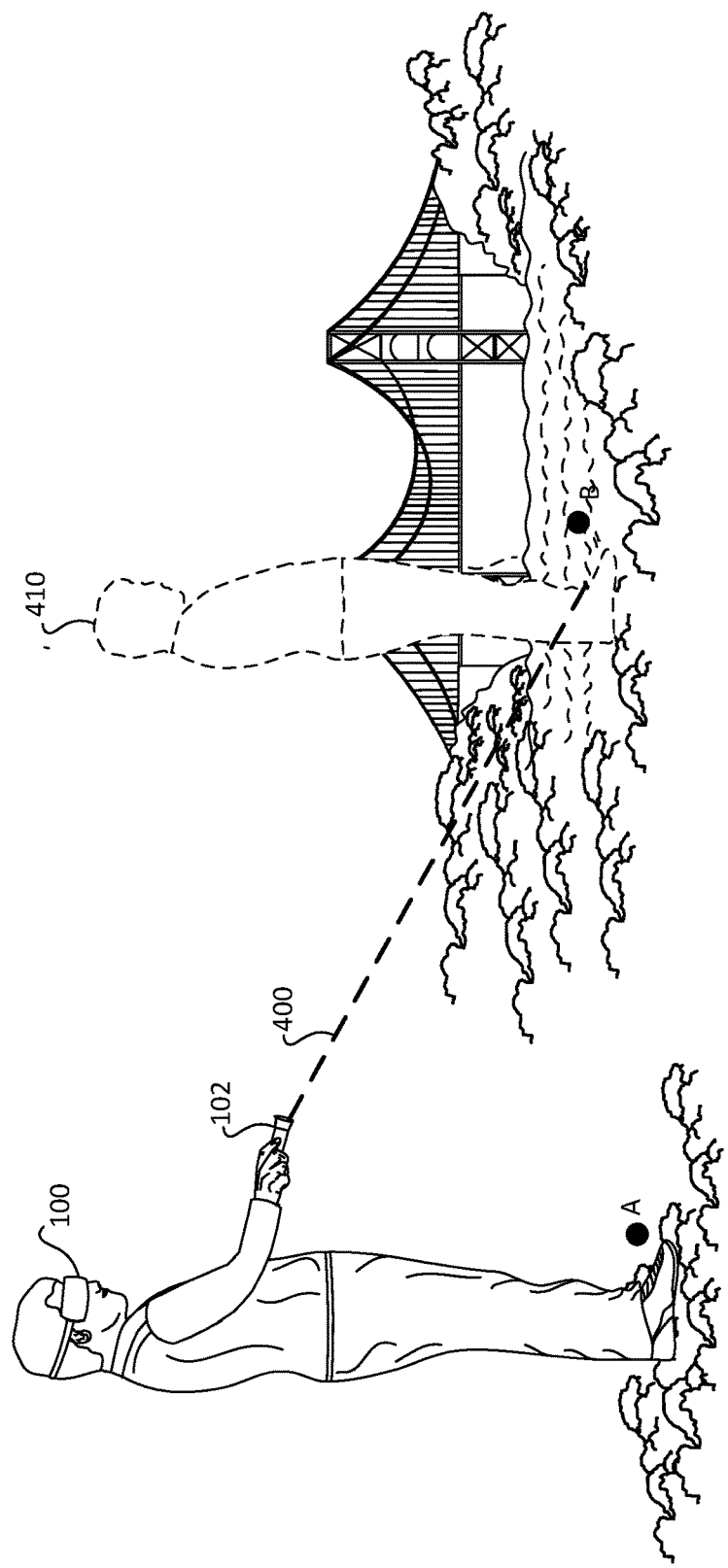
Figure 5C:
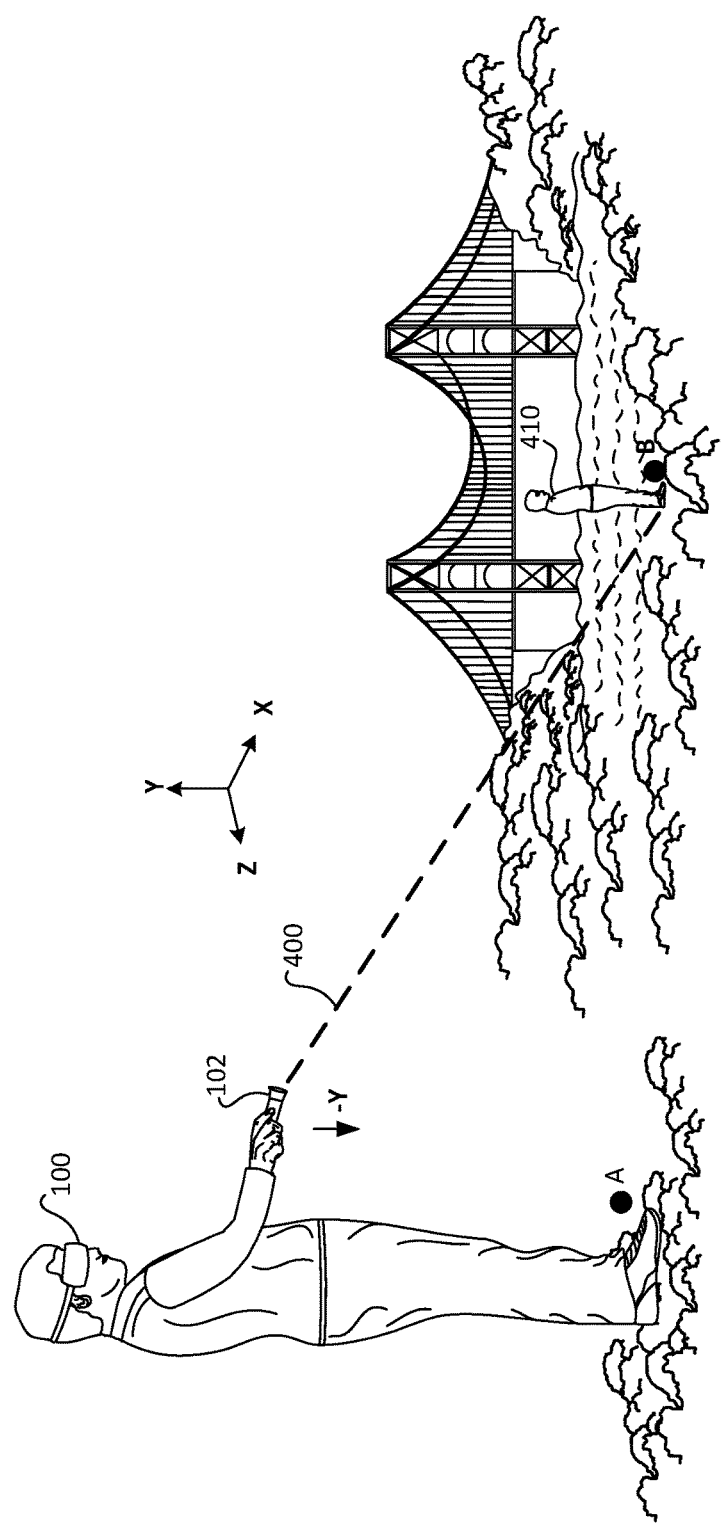
Figure 5D:
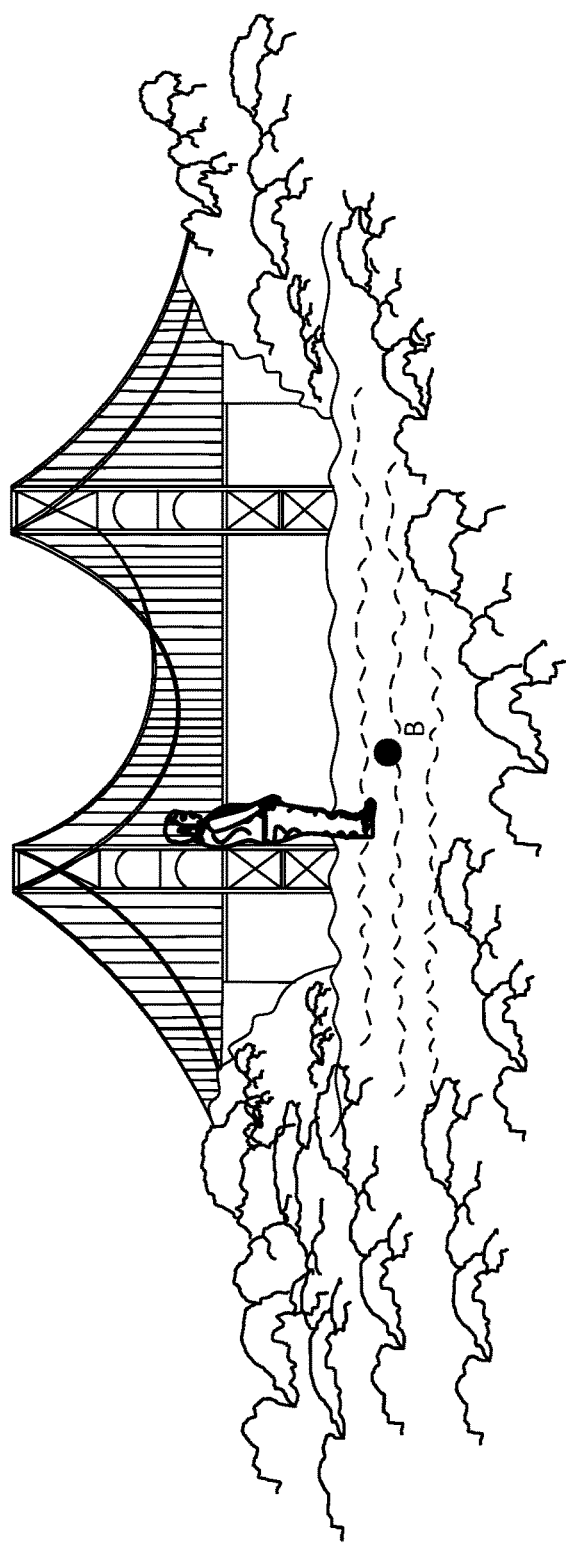

Similarly, as shown in FIG. 5A, a user positioned at the first virtual location A may actuate the trigger, or other control mechanism, on the handheld electronic device 102. Actuation of the trigger may generate the virtual beam 400, and the user may direct the virtual beam 400 so that the terminal end 400B of the virtual beam 400 is directed at the second virtual location B. Along with the virtual beam 400 directed at the second virtual location B, the system may also generate the visual representation 410 of the user, at the user's current size, or scale, as shown in FIG. 5B. By continuing to actuate the trigger and moving the handheld electronic device 102 in a downward, or −Y, direction, or manipulating the trigger in an downward, or −Y, direction, the user may decrease his size, or his scale, or adjust his perspective, relative to the virtual features at the second virtual location B, with the visual representation 410 of the user decreasing in size as the user moves the handheld electronic device 102, to provide a visual indication of relative scale to the user, as shown in FIG. 5C. Once the user has selected the desired second virtual location B and the desired second scale in this manner, and then releases the trigger, the system may teleport the user to the virtual location B, with his perspective adjusted to his decreased scale, as shown in FIG. 5D.

In the examples shown in FIGS. 4A-4D and 5A-5D, the virtual beam 400 is directed outward from the handheld electronic device 102, with subsequent movement of the virtual beam 400 to position the endpoint 400B at the second virtual location B and increase/decrease in scale accomplished by physical movement of the handheld electronic device. However in some implementations, selection of the second virtual location B may be accomplished by directing the virtual beam 400 outward from another reference point, such as, for example, the HMD 100, and/or a user eye gaze input may be used to select the second virtual location B, and/or other such selection input modes.

In the examples shown in FIGS. 4A-4D and 5A-5D, the user applies a physical movement of the handheld electronic device 102 in the upward/+Y direction and/or the downward/−Y direction to indicate a desired increase and/or decrease in scale. However, this is only one example of a manipulation of the handheld electronic device 102 which may be applied to cause an adjustment in scale. For example, in some implementations, the user may apply a drag input on a touch surface of the handheld electronic device 102 to indicate a desired increase or decrease in scale, and/or may manipulate a toggle or slide or arrow switch on the handheld electronic device 102 to indicate a desired increase or decrease in scale, or other such manipulations of the handheld electronic device 102.

FIGS. 4A-4D and 5A-5D illustrate examples in which the visual representation 410 of the user relative to the second virtual location is a shadow form of the user, at the scaled size/perspective, at the selected teleport location. However, in some implementations, the visual indicator of scale may be provided in other ways, such as, for example, a bar that increases/decreases in size, movement of a cursor along a virtual measuring device, and the like. Additionally, FIGS. 4A-4D and 5A-5D illustrate examples in which the size of the user is scaled relative to the selected teleport location. However, in some implementations, the environment may be scaled while the size of the user remains the same, providing essentially the same effect.

In the teleported states (at an increased user scale relative to the virtual environment as shown in FIG. 4D, and at a decreased user scale relative to the virtual environment as shown in FIG. 5D), the visual experience of the user is not simply a zoom out (in the case of increased user scale shown in FIG. 4D) or a zoom in (in the case of decreased user scale shown in FIG. 5D). Rather, in increasing and decreasing the user's scale, or perspective, in this manner, the user's entire overall perspective of the virtual location is adjusted. That is, the manner in which objects in the virtual location appear to the user at a scaled perspective are based on spatial attributes, or their dimensions in conjunction with the position of the eye(s) relative to the objects. For example, at an increased user scale, the appearance of virtual objects (for example, the bridge shown in FIG. 4D) at the second virtual location B appear to the user to be decreased in size, substantially commensurate with the user's increase in size, and the scale is also adjusted based on the increase in virtual distance between the user's eyes. Similarly, at a decreased user scale, the appearance of virtual objects (for example, the bridge shown in FIG. 5D) at the second virtual location B appear to the user to be increased in size, substantially commensurate with the user's decrease in size, and the scale is also adjusted based on the decrease in virtual distance between the user's eyes.

This scaling based on spatial attributes, rather than just a simple zoom in or zoom out, provides a more realistic perspective of the virtual objects at the virtual location to be experienced by the user. Further, teleportation to the virtual location while also incorporating the scaled user size and perspective may provide a relatively seamless teleportation from the first virtual location A to the second virtual location B, enhancing the user's experience in the virtual environment.

Figure 5E:
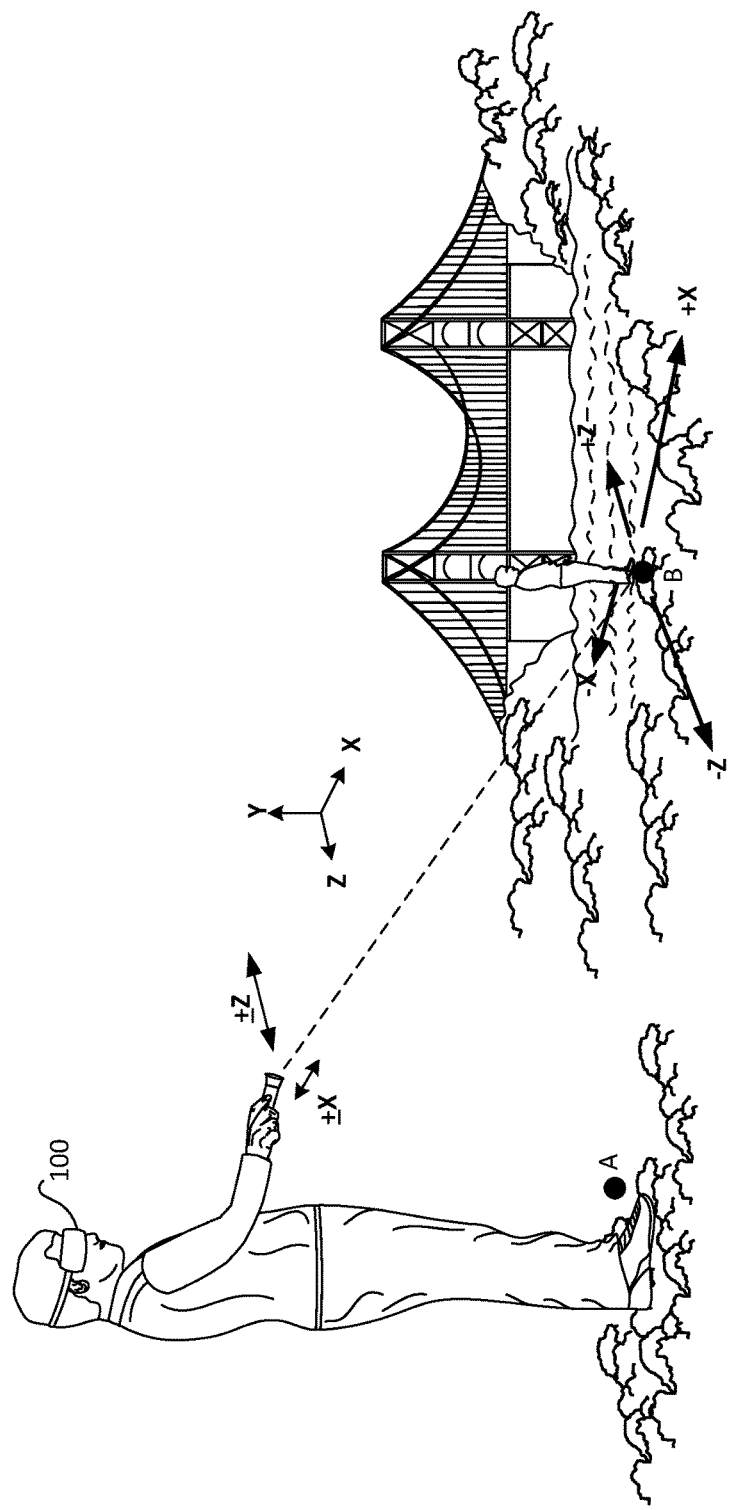

In some implementations, the user may choose to shift, or adjust, an arrival position in the second virtual location B, after initial selection of the second virtual location B, and prior to teleporting to the second virtual location B. For example, as shown in FIG. 5E, after decreasing the user's scale by the desired amount as shown in FIG. 5C (or by increasing the user's scale by the desired amount as shown in FIG. 4C), and before releasing the trigger and teleporting to the second virtual location B at the adjusted user scale, the user may shift, or adjust, his teleport arrival position, for example, to the left or right of the position indicated by the virtual location B, or the ±X direction, by moving the handheld electronic device 102 to the left or the right, or in the ±X direction (or manipulating another control mechanism of the handheld electronic device 102 in a similar manner). Similarly, as shown in FIG. 5E, before releasing the trigger and teleporting to the second virtual location B, the user may shift, or adjust, his teleport arrival position in a forward and/or backward direction, or in a ±Z direction, by moving the handheld electronic device 102 in a forward and/or backward direction, or in the ±Z direction (or manipulating another control mechanism of the handheld electronic device 102 in a similar manner). Once the user has adjusted the teleport arrival position as desired, moving the handheld electronic device 102 in the ±X direction and/or the ±Z direction as discussed above, a release of the trigger may teleport the user to the second virtual location B, at the scaled user size, and at the shifted teleport arrival position.

In some situations, the user may direct the virtual beam 400 from the handheld electronic device 102 to the virtual location B (or may direct the virtual beam 400 from the HMD 100 to the second virtual location B, or may select the second virtual location B in another way as discussed above), and may actuate the trigger as an input to teleport from the first virtual location A to the second virtual location B, as shown in FIG. 4B and FIG. 5B, and then decide that he does not want to teleport to the second virtual location B. In the implementations described above, release of the trigger (or other actuating/control mechanism of the handheld electronic device 102) at this point would automatically teleport the user from the first virtual location A to the second virtual location B, in absence of a mechanism for cancelling the command to teleport to the second virtual location B associated with the user's inputs to this point. In some implementations, a particular movement, for example, movement of the handheld electronic device 102 causing the virtual beam 400/endpoint 400B to move through a particular distance, or an angle, that is greater than a preset threshold, may cause the initial teleport command to be cancelled, prior to carrying out the teleportation from the first virtual location A to the second virtual location B.

Figure 5F:
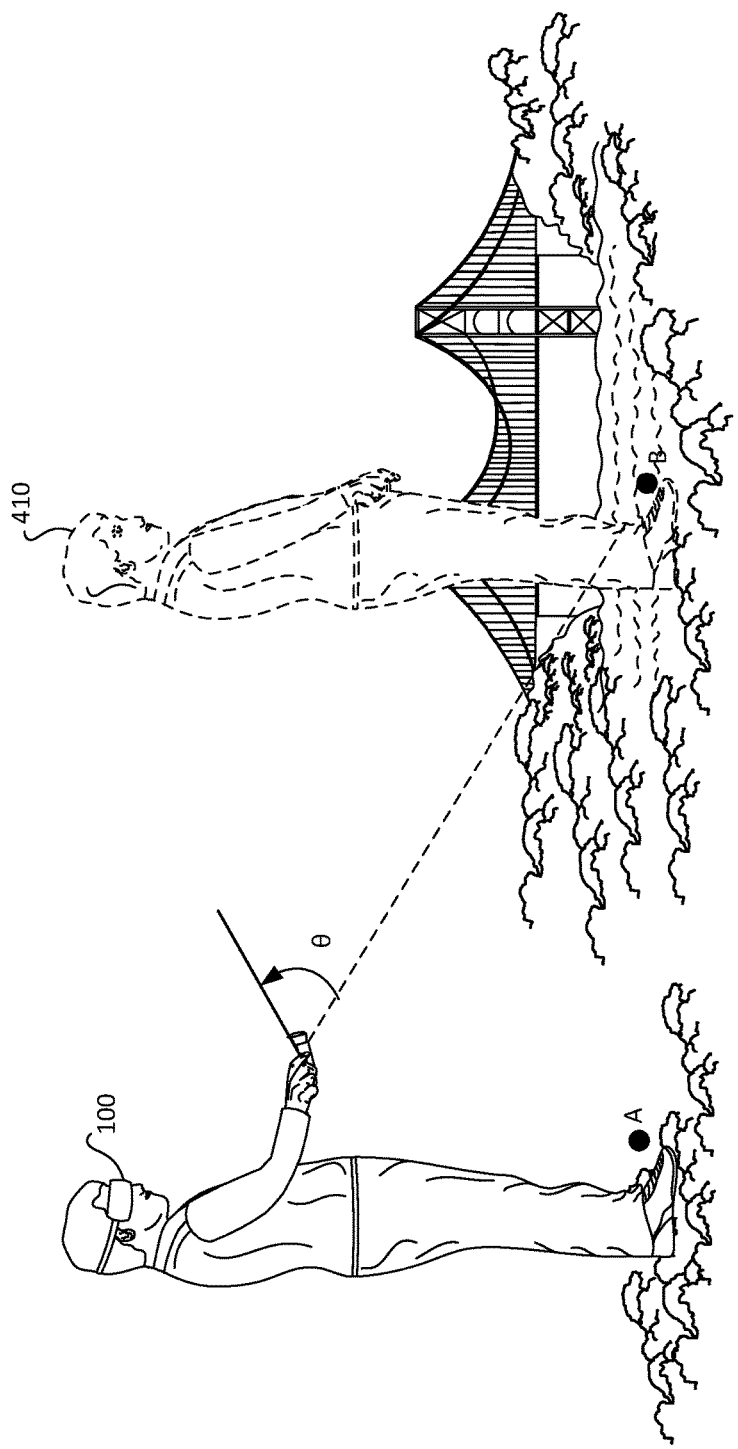

For example, as shown in FIG. 5F, after selecting the second virtual location B for teleportation (as shown in FIGS. 4B and 5B), and, if applicable, after applying any adjustments in scale (as shown in FIGS. 4C and 5C), and before releasing the trigger (or other actuation mechanism) and teleporting to the second virtual location B at the adjusted scale (if applicable), the user may move, or shift, or rotate, the handheld electronic device 102 to in turn cause the virtual beam 400/endpoint 400B to move away from the selected virtual location B by a preset distance or a preset angle. Movement through a distance or angle that exceeds the preset distance, or angle, or threshold, may cancel the user's selection of second virtual location B. This may provide the user with the ability to cancel an operation without the need to, for example, provide for additional control mechanisms beyond detecting movement of the electronic device 102.

For example, in some implementations, the user may direct the virtual beam 400 away from the second virtual location B, by moving, or shifting, or rotating the handheld electronic device 102, and the virtual beam 400, through an angular distance that is greater than a preset angle θ. In some implementations, the angle θ may be, for example, greater than or equal to 45 degrees to indicate a cancellation of the initial teleportation selection, to avoid overlap with an input to shift the teleport arrival position as described above. In some implementations, the angle θ may be less than 45 degrees.

In some implementations, cancellation of the user's initiation of a command to teleport to the selected second virtual location B described above may be performed out in a manner corresponding to the manner in which the second virtual location B was selected. For example, in some implementations, in which the second virtual location B is selected based on an eye gaze directed at the second virtual location B, or by a virtual beam directed outward from the HMD 100, the initial command to teleport to the second virtual location B may be cancelled by a head movement, or shift, or rotation that is greater than a preset threshold.

Figure 6A:
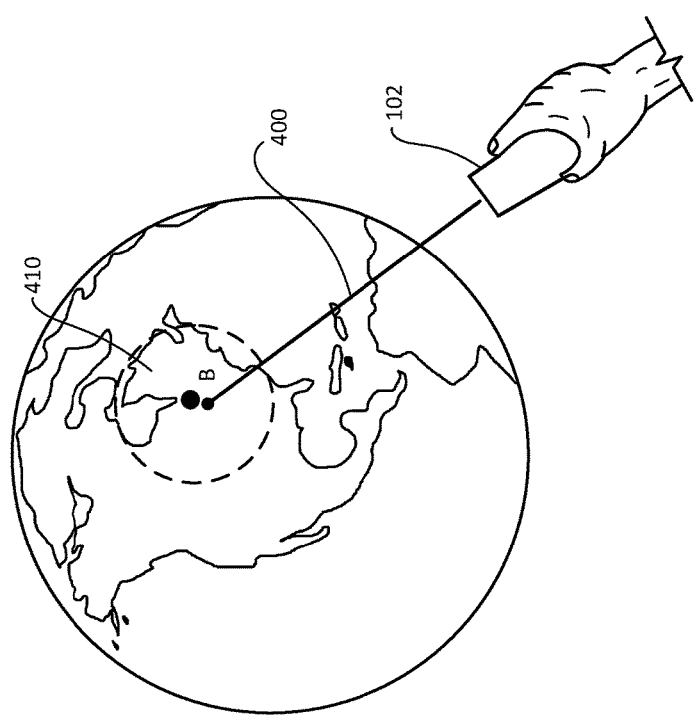

Principles associated with the teleportation and scaling in a terrain view as described above with respect to FIGS. 4A-4D and 5A-5F may also be applied to teleportation and scaling in a space view in a similar manner. For example, as shown in FIG. 6A, a user may be presented, for example, on the display 140 of the HMD 100, with a virtual rendering of the earth as viewed from space. The user may direct the virtual beam 400 from the handheld electronic device 102 toward the virtual rendering of the earth, positioning the endpoint 400B at the selected virtual location B, and may actuate the trigger (or other control mechanism) of the handheld electronic device 102 to select the second virtual location B.

Figure 6B:
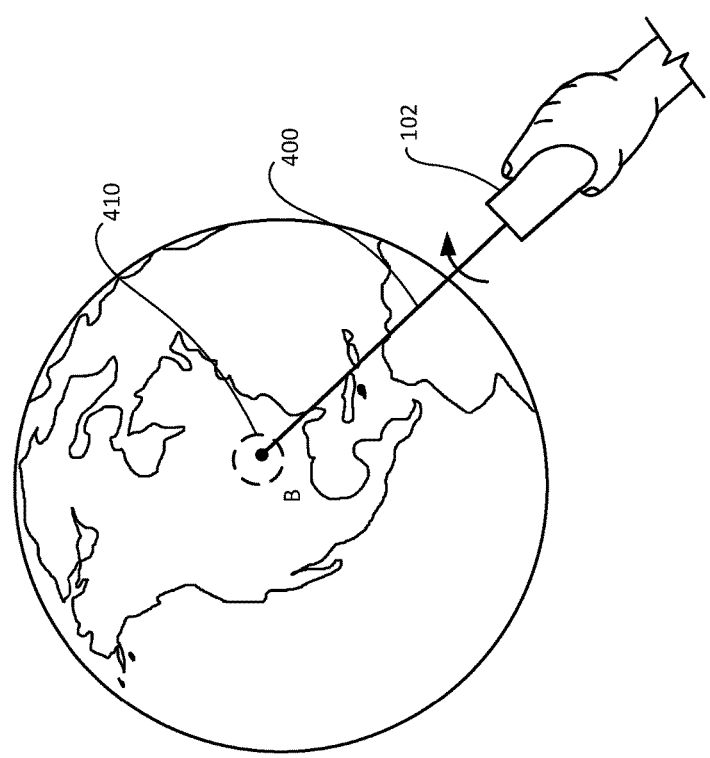
Figure 6C:
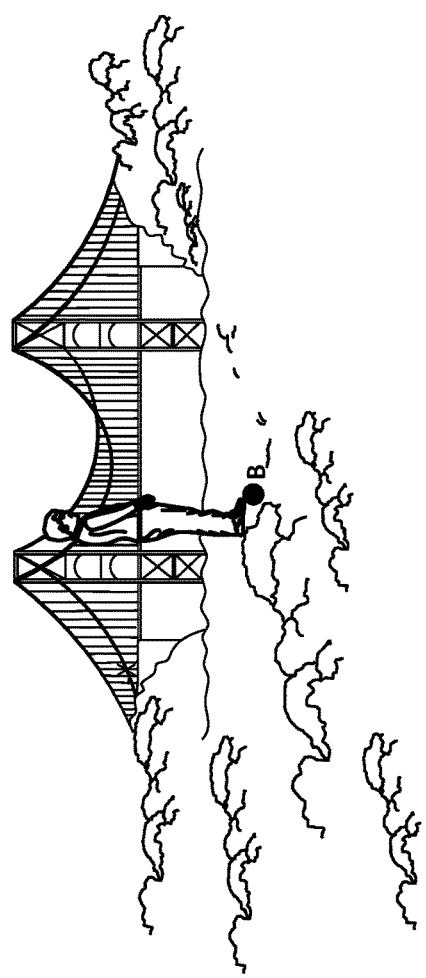

In this space view arrangement, the visual representation 410 of the user's relative scale, or perspective relative to the virtual environment selected for teleportation, may be represented by, for example, a circle or disc, or other shape or rendering. While continuing to depress the trigger, the user may move, or rotate, the handheld electronic device 102 and the virtual beam 400 in a first direction to adjust, for example, decrease the user's relative scale, with a corresponding decrease in the visual representation 410, as shown in FIG. 6B. In this example, the decreased user scale may be reflected in the decreased size, or area, of the visual representation 410 of the user scale. Upon release of the trigger, the system may teleport the user to the selected virtual location B at the decreased user scale, or perspective, as shown in FIG. 6C. Teleportation to the virtual location B at an increased user scale (rather than the decreased user scale shown in FIG. 6B) may be performed out in a similar manner. This may be accomplished by, for example, moving, or rotating the handheld electronic device 102 and virtual beam 400 in the opposite direction from that shown in FIG. 6B, to increase, rather than decrease, the size of the visual representation 410 of the user scale prior to releasing the trigger and teleporting to the selected virtual location B.

Figure 6D:
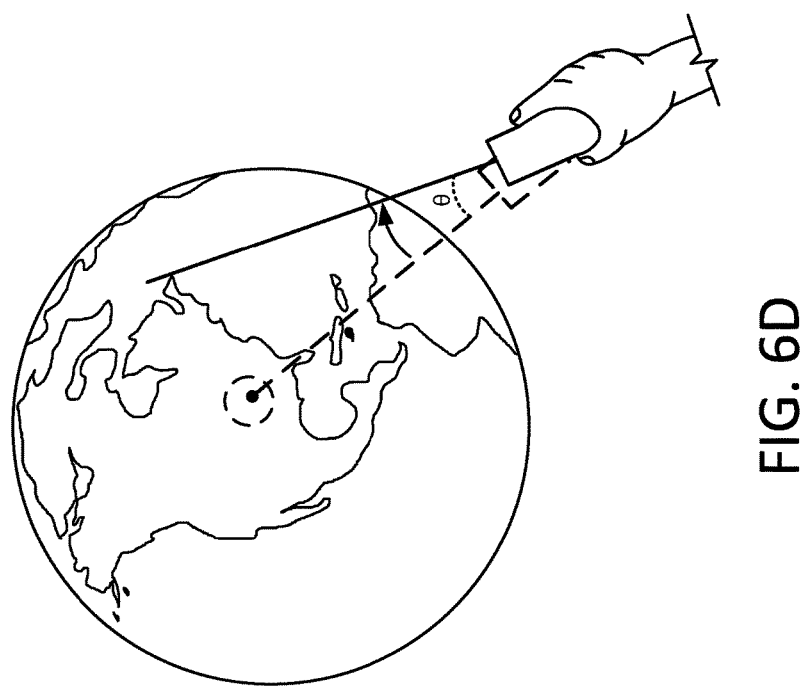

Similar to what is described above, after selecting the second virtual location B (as shown in FIG. 6A), and before releasing the trigger and teleporting to the second virtual location B, the user may cancel the selected teleportation by shifting, or rotating, or otherwise moving the handheld electronic device 102 and virtual beam 400 away from the virtual location B through, for example, an angular distance that is greater than a preset angle θ, as shown in FIG. 6D.

Figure 7:
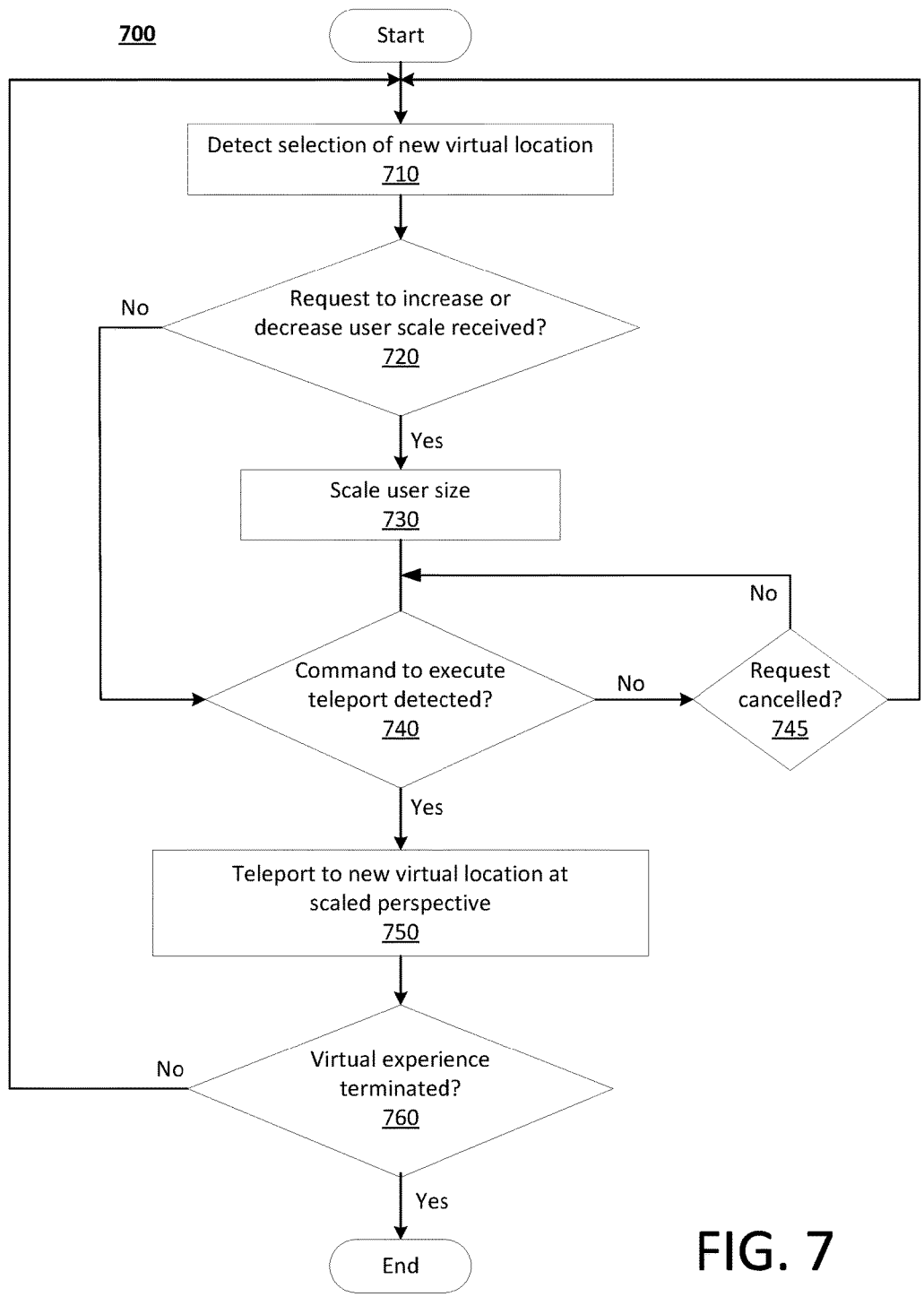
FIG. 7 is a flowchart of a method of teleporting in an augmented and/or virtual reality environment, in accordance with implementations as described herein.

A method of teleporting in an augmented and/or virtual reality environment, in accordance with implementations as described herein, is shown in FIG. 7. Upon detection of a selection of a new virtual location, indicating initiation of a user input or command to teleport from a current virtual location to the newly selected virtual location (block 710), it may be determined whether or not a command to adjust (for example, increase and/or decrease) a user perspective and/or a user scale relative to the newly selected virtual location has been received (block 720). If a command to adjust the user's perspective and/or scale has been received, the relative perspective and/or scale may be increased and/or decreased in accordance with the received command (block 730). Detection of the selection of the new virtual location, and the command to increase and/or decrease user perspective and/or scale relative to the newly selected virtual location may be performed out as described above with respect to FIGS. 4A-4D, 5A-5F and 6A-6D. After the user has completed the inputting of the command to adjust relative perspective and/or scale, and a command (such as, for example, release of a trigger, or other manipulation of the handheld electronic device and/or HMD) to teleport to the newly selected virtual location at the adjusted perspective and/or scale is detected (block 740), the system may teleport the user to the newly selected virtual location at the newly selected user perspective and/or scale (block 750). When a command to teleport and/or scale is not detected, it is determined whether or not the selection of the new virtual location has been cancelled (block 745). Detection of a cancellation of the command to teleport to the newly selected virtual location may be performed out as described above with respect to FIGS. 5F and 6D. This process may be performed out until it is determined that the virtual reality experience has been terminated (block 760).

Figure 8:
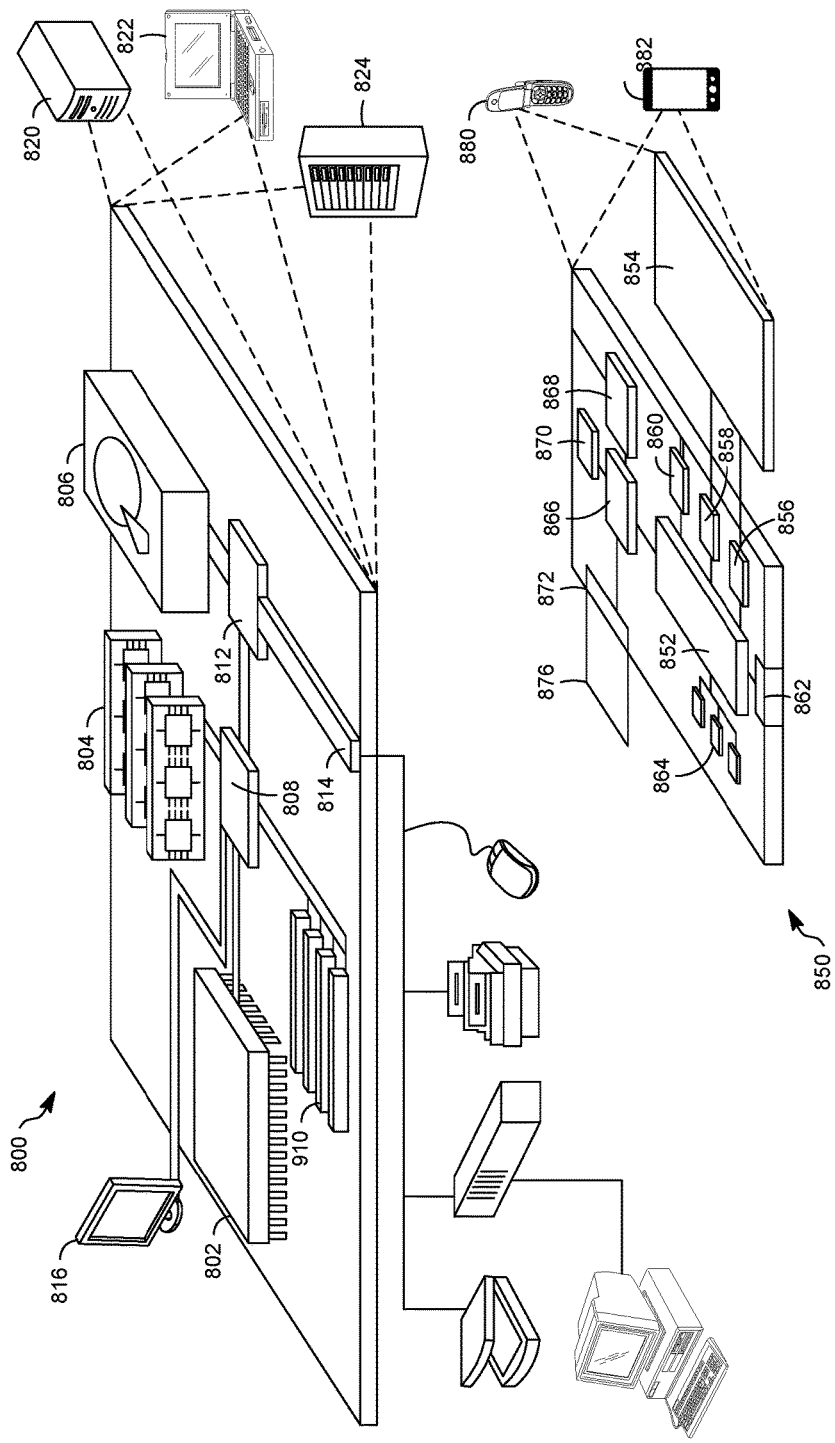
FIG. 8 shows an example of a computer device and a mobile computer device that can be used to implement the techniques described herein.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    generating a virtual rendering of a first virtual location at a first virtual scale in a virtual environment;
    receiving an input selecting a second virtual location in response to a detected actuation of an input device, and a second virtual scale in response to a detected physical scaling movement of the input device, for viewing of the second virtual location at the second virtual scale, the first virtual scale being different than the second virtual scale; and
    teleporting to the second virtual location at the second virtual scale in response to the input such that a virtual rendering of the second virtual location is generated at the second virtual scale in the virtual environment.

2. The method of claim 1, wherein receiving the input includes:
    generating a virtual beam directed from the input device at the second virtual location, based on a detected physical orientation of the input device relative to the second virtual location; and
    detecting the physical scaling movement of the input device, including detecting a corresponding virtual movement of the virtual beam.

3. The method of claim 2, wherein teleporting to the second virtual location at the second virtual scale includes:
    detecting a release of the actuation of the input device after detecting the selection of the second virtual location and the selection of the second virtual scale; and
    teleporting to the second virtual location at the second virtual scale in response to the detected release of the actuation of the input device.

4. The method of claim 3, wherein actuating the input device includes maintaining the actuation of the input device, and not releasing the actuation of the input device until after the second virtual location and the second virtual scale are selected.

5. The method of claim 4, wherein teleporting to the second virtual location at the second virtual scale includes teleporting to the second virtual location at the second virtual scale simultaneously in response to the detected release of the actuation of the input device.

6. The method of claim 5, wherein the input device includes at least one of a trigger of a handheld electronic device, a touch sensitive surface of the handheld electronic device, a button of the handheld electronic device, a joystick of the handheld electronic device, or a toggle switch of the handheld electronic device.

7. The method of claim 2, wherein detecting the physical scaling movement of the input device includes detecting a first movement of the input device corresponding to the selection of the second scale, including:
    detecting an initial position of the input device corresponding to an initial virtual position of the portion of the virtual beam; and
    at least one of
        detecting a first physical movement of the input device in an upward direction from the initial position of the input device, corresponding to an upward virtual movement of the portion of the virtual beam from the initial virtual position of the portion of the virtual beam, the detected first physical movement corresponding to an increase in virtual scale from the first virtual scale to the second virtual scale, or
        detecting a second physical movement of the input device in a downward direction from the initial position of the input device, corresponding to a downward virtual movement of the portion of the virtual beam from the initial virtual position of the portion of the virtual beam, the detected second physical movement corresponding to a decrease in virtual scale from the first virtual scale to the second virtual scale.

8. The method of claim 7, wherein detecting the physical movement of the input device includes detecting a third physical movement of the input device, corresponding to a shift in a teleport arrival position relative to the selected second virtual location, including:
    at least one of
        detecting a physical movement of the input device corresponding to a virtual shift in the portion of the beam in a lateral direction, or
        detecting a physical movement of the input device corresponding to a virtual shift in the portion of the beam in a forward and rearward direction; and
    shifting the teleport arrival position relative to the selected second virtual location based on the detected third physical movement of the input device and corresponding virtual shift of the portion of the beam.

9. The method of claim 8, wherein teleporting to the second virtual location at the second virtual scale includes:
    detecting a release of the actuation of the input device after detecting the selection of the second virtual location, detecting the selection of the second virtual scale, and shifting the teleport arrival position; and teleporting to the second virtual location at the second virtual scale and at the shifted teleport arrival position in response to the detected release of the actuation of the input device.

10. The method of claim 9, wherein teleporting to the second virtual location at the second virtual scale and at the shifted teleport arrival position includes teleporting to the second virtual location at the second virtual scale and at the shifted teleport arrival position simultaneously.

11. The method of claim 3, further comprising:
detecting a cancellation movement of the input device and a corresponding movement of the virtual beam in a direction away from the second virtual location, after detecting the selection of the second virtual location and the selection of the virtual scale, and before detecting the release of the actuation of the input device; and
cancelling selection of the second virtual location and the second virtual scale in response to the detected cancellation movement of the input device and corresponding movement of the virtual beam.

12. The method of claim 11, wherein detecting a cancellation movement of the input device and a corresponding movement of the virtual beam includes detecting a movement of the input device that exceeds a preset threshold.

13. The method of claim 12, wherein detecting a movement of the input device that exceeds a preset threshold includes detecting a movement of the input device that is greater than a preset angular distance.

14. The method of claim 1, wherein the virtual rendering of first virtual location at the first scale and the virtual rendering of the second virtual location at the second scale are displayed in an augmented reality environment.

15. A system, comprising: a computing device configured to generate a virtual environment, the computing device including: a memory storing executable instructions; and a processor configured to execute the instructions to cause the computing device to: generate a virtual rendering of a first virtual location at a first virtual scale for viewing in a virtual environment; receive an input including selection of a second virtual location in the virtual environment, and selection of a second virtual scale for the second virtual location, including: detect the selection of the second virtual location in response to a detected actuation of an input device; and detect the selection of the second virtual scale in response to a detected physical scaling movement of the input device; and teleport to the second virtual location at the second virtual scale in response to the input, including generate a virtual rendering of the second virtual location at the second virtual scale for viewing in the virtual environment.

16. The system of claim 15, wherein the processor is configured to detect the input, the input being received at a handheld electronic device operably coupled with the computing device.

17. The system of claim 16, the detection of the input also including:
detection of a portion of a virtual beam generated in response to the actuation of the input device, based on a detection of a physical orientation of the input device relative to the second virtual location, the detected portion of the virtual beam corresponding to the selection of the second virtual location; and
detection of a virtual movement of the portion of the virtual beam in response to a detected physical movement of the input device, the detected virtual movement of the portion of the virtual beam corresponding to the selection of the second virtual scale.

18. The system of claim 17, wherein the detected virtual movement of the portion of the virtual beam includes at least one of:
a first virtual movement of the portion of the virtual beam, including at least one of a virtual movement of the portion of the virtual beam in an upward direction corresponding to an increase in virtual scale from the first virtual scale to the second virtual scale, or a virtual movement of the portion of the virtual beam in a downward direction corresponding to a decrease in virtual scale from the first virtual scale to the second virtual scale; or
a second virtual movement of the portion of the virtual beam corresponding to a virtual shift in a teleport arrival position relative to the selected second virtual location, including at least one of a virtual movement of the portion of the virtual beam in lateral direction, or a virtual movement of the portion of the virtual beam in a forward and rearward direction.

19. The system of claim 16, wherein the input device includes at least one of a trigger of a handheld electronic device, a button of the handheld electronic device, a joystick of the handheld electronic device, a toggle switch of the handheld electronic device, or a touch sensitive surface of the handheld electronic device.

20. The system of claim 17, wherein the processor is further configured to execute the instructions to cause the computing device to:
detect a cancellation movement of the input device and a corresponding movement of the portion of the virtual beam in a direction away from the second virtual location, after detecting the selection of the second virtual location and the selection of the virtual scale, and before teleporting to the second virtual location; and
cancel the selection of the second virtual location and the second virtual scale in response to the detected cancellation movement of the input device and corresponding movement of the portion of the virtual beam.

21. The system of claim 20, wherein the cancellation movement of the input device and the corresponding movement of the portion of the virtual beam includes detection of a physical movement of the input device that is greater than a preset angular distance.

22. A method, comprising:
generating a virtual rendering of a first virtual location at a first virtual scale for display in a virtual environment;
receiving an input in response to a detected actuation of an input device, including:
receiving a selection of a second virtual location based on a virtual beam directed from the input device at the second virtual location; and
receiving a selection of a second virtual scale for the second virtual location, the second virtual scale being different than the first virtual scale;
cancelling the selection of the second virtual location and the second virtual scale in response to detection of a cancellation movement of the input device after receiving the selection of the second virtual location and the second virtual scale and before detecting a release of the actuation of the input device, the cancellation movement including a movement of the virtual beam in a direction away from the second virtual location; and
teleporting to the second virtual location at the second virtual scale in response to a detected release of the actuation of the input device, including generating a virtual rendering of the second virtual location at the second virtual scale for display in the virtual environment.

23. A method, comprising:

generating a virtual rendering of a first virtual location at a first virtual scale for display in a virtual environment;

receiving an input in response to a detected actuation of an input device, including:
    receiving selection of a second virtual location based on a virtual beam directed from the input device at the second virtual location; and
    receiving selection of a second virtual scale for the second virtual location, the second virtual scale being different than the first virtual scale;

shifting a teleport arrival position relative to the selected second virtual location in response to a detected physical shifting movement of the input device and corresponding virtual shift of the virtual beam, including at least one of:
    detecting a physical movement of the input device corresponding to a virtual shift of the virtual beam in a lateral direction; or
    detecting a physical movement of the input device corresponding to a virtual shift of the virtual beam in a forward and rearward direction; and teleporting to the shifted teleport arrival position relative to the second virtual location at the second virtual scale in response to the selection input, including generating a virtual rendering of the second virtual location at the second virtual scale for display in the virtual environment.

* * * * *